T. L. FERRALL.
PERCOLATOR.
APPLICATION FILED JULY 14, 1911.
1,009,142.
Patented Nov. 21, 1911.
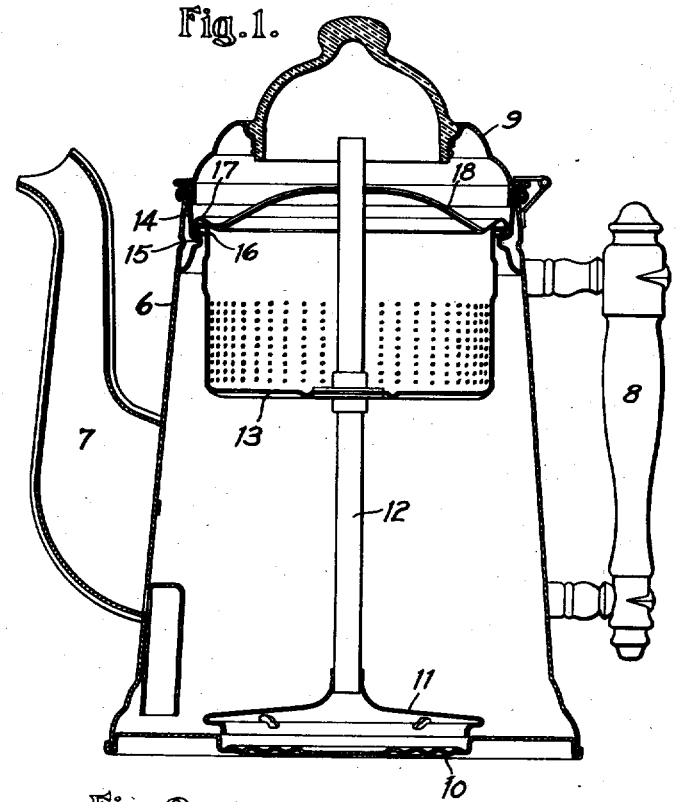
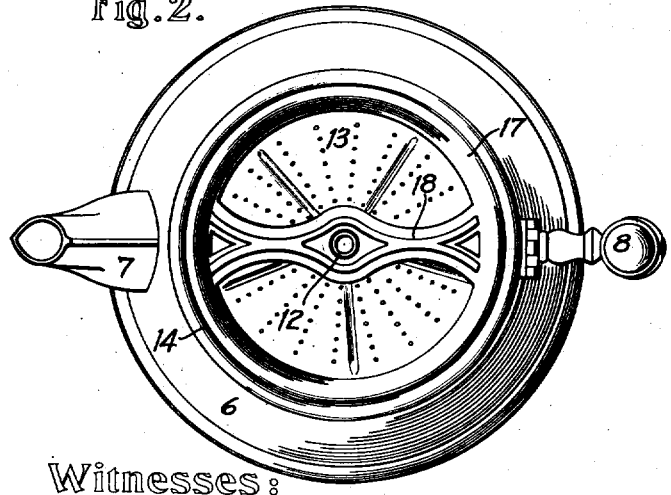
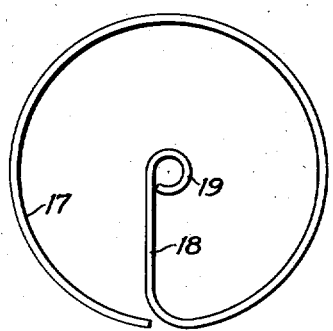
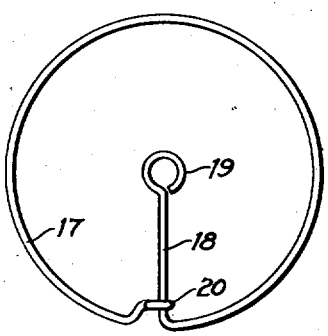
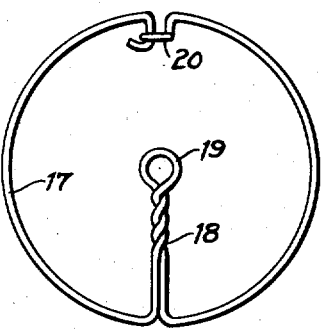

UNITED STATES PATENT OFFICE.

THOMAS L. FERRALL, OF ROCHESTER, NEW YORK.

PERCOLATOR.

1,009,142.   Specification of Letters Patent.   Patented Nov. 21, 1911.

Application filed July 14, 1911. Serial No. 638,538.

*To all whom it may concern:*

Be it known that I, THOMAS L. FERRALL, a citizen of the United States, and resident of Rochester, in the county of Monroe and State of New York, have invented certain new and useful Improvements in Percolators, of which the following is a specification.

This invention relates to utensils, for making coffee or other beverages, of the type commonly termed "percolators". A percolator as commonly constructed comprises a body or pot in which water may be heated, this pot being provided with a removable foraminiferous container or strainer in which coffee or other material may be contained, and with a device, commonly designated as a "pump", through which water is forced by the generation of steam so as to raise the water and discharge it over the contents of the strainer. For the purpose of conveniently cleaning the percolator the strainer and the pump are commonly made as a unitary device removable from the pot.

In a percolator of the construction just described, when the pot is tipped to pour out its contents, the pump and strainer are liable to be displaced from proper operative position, and accordingly they will not operate properly thereafter unless the pot is opened and they are readjusted by hand.

The object of the present invention is to provide a simple and effective device by which the removable strainer and pump may normally be held securely in proper position so as not to be displaced in the manner described, while the construction of the retainer is such that it may be readily removed to release the strainer and pump.

To the foregoing end I employ an annular member adapted to be removably fixed in the pot just above the strainer so as to engage the latter and retain it against its seat, and in the preferred embodiment of the invention this retainer is also provided with means for engaging and centering the jet-pipe of the pump so as to afford further security.

In the accompanying drawings:—Figure 1 is a vertical section of a percolator embodying the present invention; Fig. 2 is a plan-view of the percolator of Fig. 1, with the cover removed; and Figs. 3, 4 and 5 are plan-views of retainers of modified forms.

The percolator illustrated in Figs. 1 and 2 has a general form which is well known. It comprises a coffee-pot 6 having the usual spout 7, handle 8, and cover 9. The bottom of the pot is provided with a depressed portion 10 adapted to engage the surface of a stove so as to concentrate the heat and produce ebullition at this point. The pump comprises a steam-dome 11, from the center of which a jet-pipe 12 projects upwardly to the top of the pot. A strainer 13 of ordinary cylindrical form is fixed to the jet-pipe. The pot is provided at the top with a depending inwardly-tapering member 14 having a ledge 15 formed thereon, and the upper edge of the strainer is rolled outwardly to form a flange 16 resting upon the ledge 15. In this manner the strainer and the pump are supported in proper position in the pot, and the steam-dome is thus held in coöperative relation with the depression 10 in the bottom of the pot.

The retainer, in which the present invention particularly resides, may be formed in various manners, but in Figs. 1 and 2 it is shown as punched and stamped from sheet-metal. In these figures it comprises an endless annular portion 17 which is of such diameter that when forced downwardly into the member 14 of the pot it wedges therein, so as to be retained frictionally at a point just above the upper edge of the strainer, and thus the strainer is securely retained against the ledge 15 by this annular member 17. For further security, however, and also to afford convenient means for handling the retainer, the retainer is provided with a cross-bar 18 integral with the annular portion 17. This cross-bar is centrally perforated to register with the jet-pipe 12, so that when the retainer is in place the jet-pipe is securely retained in its central position in the pot. The cross-bar is illustrated as embossed, both to stiffen it and for ornamental purposes. When the strainer and the pump are to be removed to clean the pot, they are readily released, as the retainer may be conveniently withdrawn by pulling upwardly against the cross-bar.

A simpler and cheaper form in which the retainer may be constructed is shown in Fig. 3. In this case it consists entirely of a single length of wire, this wire being bent first to form a resilient annular portion or ring 17. From one end of this portion the wire is then bent inwardly, as at 18, and terminates in an eye 19 concentric with the ring 17 and adapted to engage and retain the jet-pipe.

The retainer illustrated in Fig. 4 is similar in construction to that of Fig. 3 except that the free end of the ring 17 is formed as an eye 20 looped about the portion 18.

In the form illustrated in Fig. 5 also the retainer is formed of a single piece of wire, but in this case the wire is bent at the middle to form the eye 19, then twisted to form the inward extension 18, and bent thence in opposite directions to form the ring 17, the ends of the wire being finally looped together to prevent relative vertical displacement.

While I have described several forms in which my novel retainer may be constructed, it is obvious that the invention is not limited to such embodiments, but may be embodied in various other forms within the nature of the invention as it is defined in the following claims.

I claim:—

1. The combination, with a percolator comprising a pot, and a strainer and a pump revolubly seated in the pot, of an independant, removable retainer having an annular portion closely fitting the pot and adapted to be frictionally secured therein above the strainer so as to normally engage the upper extremity of the strainer and to retain the strainer and the pump in operative position when the pot is tipped.

2. The combination, with a percolator comprising a pot, a pump having a jet-pipe projecting upwardly in the pot, and a strainer surrounding the jet-pipe and removably seated in the pot, of an independently removable retainer having an annular portion closely fitting the pot and adapted to be frictionally retained therein in engagement with the upper extremity of the strainer, and an inward extension from said annular portion perforated to receive and retain the jet-pipe.

3. A percolator having, in combination, a pot provided, near the top, with a downwardly-tapering portion terminating in an annular shoulder, a strainer removably seated upon said shoulder, and an independently-removable retainer having an annular portion adapted to fit closely, and engage frictionally, said tapering portion of the pot and to engage the upper extremity of the strainer to retain the strainer normally in operative position when the pot is tipped.

4. A percolator having, in combination, a pot provided, near the top, with a downwardly-tapering portion terminating in an annular shoulder, a strainer normally seated upon said shoulder, a pump comprising a jet-pipe projecting upwardly through, and carried by, the strainer, and an independently-removable retainer comprising an annular member closely fitting and adapted to frictionally engage said tapering portion of the pot so as to retain the strainer upon said shoulder and an inwardly-projecting member adapted to engage and retain the jet-pipe in operative position.

THOMAS L. FERRALL.

Witnesses:
C. S. DAVIS,
D. GURNEE.

Copies of this patent may be obtained for five cents each, by addressing the "Commissioner of Patents, Washington, D. C."

---

Correction in Letters Patent No. 1,009,142.

It is hereby certified that in Letters Patent No. 1,009,142, granted November 21, 1911, upon the application of Thomas L. Ferrall, of Rochester, New York, for an improvement in "Percolators," an error appears in the printed specification requiring correction as follows: Page 2, line 27, for the word "revolubly" read *removably;* and that the said Letters Patent should be read with this correction therein that the same may conform to the record of the case in the Patent Office.

Signed and sealed this 19th day of December, A. D., 1911.

[SEAL.]

E. B. MOORE,
*Commissioner of Patents.* at 18, and terminates in an eye 19 concentric with the ring 17 and adapted to engage and retain the jet-pipe.

The retainer illustrated in Fig. 4 is similar in construction to that of Fig. 3 except that the free end of the ring 17 is formed as an eye 20 looped about the portion 18.

In the form illustrated in Fig. 5 also the retainer is formed of a single piece of wire, but in this case the wire is bent at the middle to form the eye 19, then twisted to form the inward extension 18, and bent thence in opposite directions to form the ring 17, the ends of the wire being finally looped together to prevent relative vertical displacement.

While I have described several forms in which my novel retainer may be constructed, it is obvious that the invention is not limited to such embodiments, but may be embodied in various other forms within the nature of the invention as it is defined in the following claims.

I claim:—

1. The combination, with a percolator comprising a pot, and a strainer and a pump revolubly seated in the pot, of an independant, removable retainer having an annular portion closely fitting the pot and adapted to be frictionally secured therein above the strainer so as to normally engage the upper extremity of the strainer and to retain the strainer and the pump in operative position when the pot is tipped.

2. The combination, with a percolator comprising a pot, a pump having a jet-pipe projecting upwardly in the pot, and a strainer surrounding the jet-pipe and removably seated in the pot, of an independently removable retainer having an annular portion closely fitting the pot and adapted to be frictionally retained therein in engagement with the upper extremity of the strainer, and an inward extension from said annular portion perforated to receive and retain the jet-pipe.

3. A percolator having, in combination, a pot provided, near the top, with a downwardly-tapering portion terminating in an annular shoulder, a strainer removably seated upon said shoulder, and an independently-removable retainer having an annular portion adapted to fit closely, and engage frictionally, said tapering portion of the pot and to engage the upper extremity of the strainer to retain the strainer normally in operative position when the pot is tipped.

4. A percolator having, in combination, a pot provided, near the top, with a downwardly-tapering portion terminating in an annular shoulder, a strainer normally seated upon said shoulder, a pump comprising a jet-pipe projecting upwardly through, and carried by, the strainer, and an independently-removable retainer comprising an annular member closely fitting and adapted to frictionally engage said tapering portion of the pot so as to retain the strainer upon said shoulder and an inwardly-projecting member adapted to engage and retain the jet-pipe in operative position.

THOMAS L. FERRALL.

Witnesses:
C. S. DAVIS,
D. GURNEE.

Copies of this patent may be obtained for five cents each, by addressing the "Commissioner of Patents, Washington, D. C."

---

It is hereby certified that in Letters Patent No. 1,009,142, granted November 21, 1911, upon the application of Thomas L. Ferrall, of Rochester, New York, for an improvement in "Percolators," an error appears in the printed specification requiring correction as follows: Page 2, line 27, for the word "revolubly" read *removably;* and that the said Letters Patent should be read with this correction therein that the same may conform to the record of the case in the Patent Office.

Signed and sealed this 19th day of December, A. D., 1911.

[SEAL.]

E. B. MOORE,

*Commissioner of Patents.*

It is hereby certified that in Letters Patent No. 1,009,142, granted November 21, 1911, upon the application of Thomas L. Ferrall, of Rochester, New York, for an improvement in "Percolators," an error appears in the printed specification requiring correction as follows: Page 2, line 27, for the word "revolubly" read *removably;* and that the said Letters Patent should be read with this correction therein that the same may conform to the record of the case in the Patent Office.

Signed and sealed this 19th day of December, A. D., 1911.

[SEAL.]                                                  E. B. MOORE,

*Commissioner of Patents.*